Feb. 14, 1961   J. R. EVANS   2,971,541
SHUTTLE STRUCTURE
Filed Dec. 1, 1959
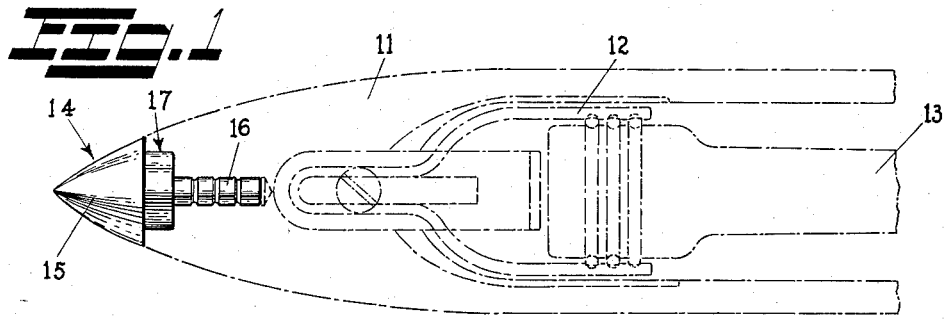
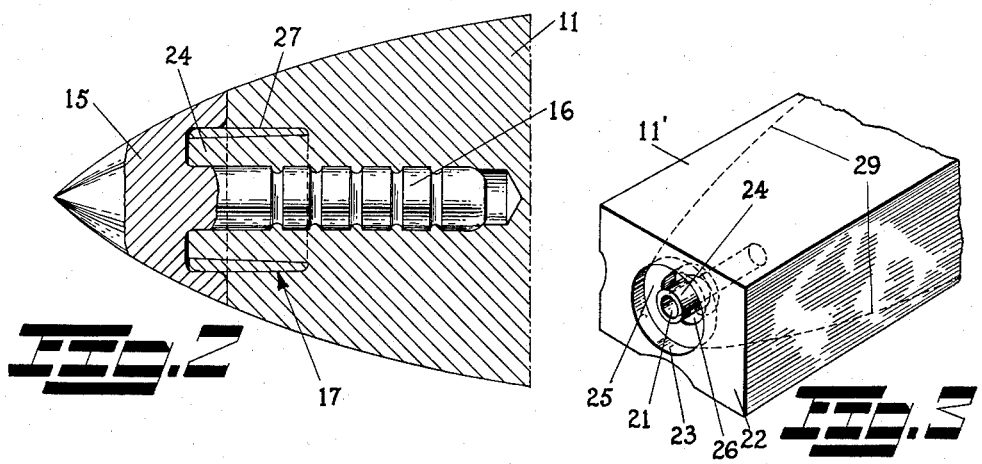
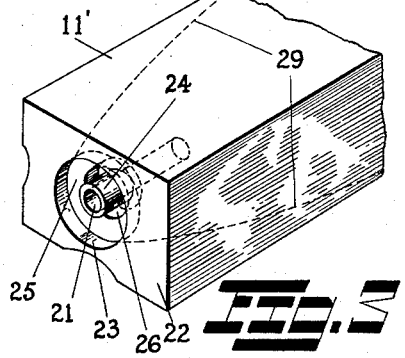
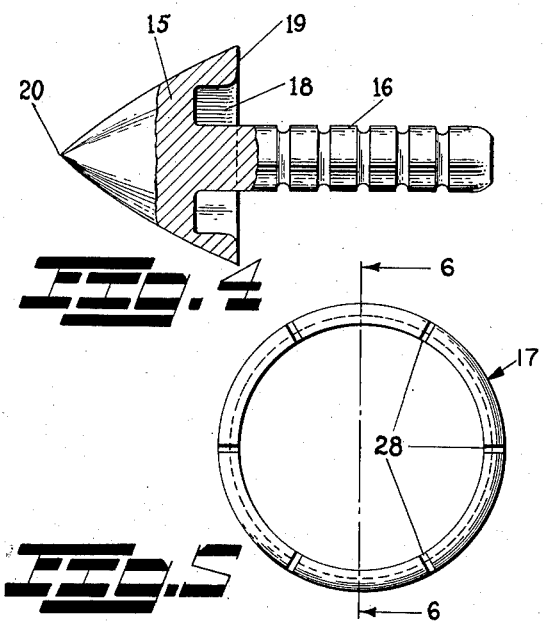
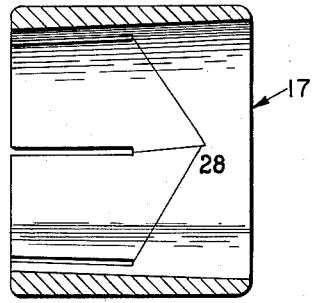
INVENTOR.
JOSEPH R. EVANS
BY
*Rodney C. Sentleworth*
ATTORNEY United States Patent Office 2,971,541
Patented Feb. 14, 1961

2,971,541

SHUTTLE STRUCTURE

Joseph R. Evans, Milford, Mass., assignor to Draper Corporation, Hopedale, Mass., a corporation of Maine Filed Dec. 1, 1959, Ser. No. 856,495

5 Claims. (Cl. 139—196)

This invention relates to loom shuttles and, particularly, to an improved manner of securing shuttle spurs to the ends of such shuttles.

In United States Patent No. 2,501,624 there is disclosed a shuttle spur which includes a tip and a shank portion extending therefrom which is forced into a bore of somewhat smaller diameter than the shank at either end of the shuttle. In order further to secure the shank within the bore, there is provided a split sleeve which is insertable partly into a recess in the tip at the base thereof and partly into a recess circumscribing the bore. The dimensions of the recesses, shank, bore and sleeve are selected so that there is compression exerted by the shank and tip against the sleeve and the surrounding body portion of the shuttle after the various parts have been press fitted together. The disadvantage of this construction is that when the spur shank begins to progress into the smaller bore and expansion of the column between the bore and the recess occurs, a crack usually develops in the column due to its not being completely contained by the split sleeve. By the time the recess in the tip encloses the sleeve and causes it and the column to contract, the crack has already developed. This crack presents itself as a defect in the shutt'e and oftentimes progresses, resulting in splitting of the shuttle.

It is the general object of the invention to provide an improved shuttle spur structure which is similar in many respects to that of the above-cited patent but which does not result in any splitting of the shuttle.

More specifically, it is an object to improve the structure and function of the retaining sleeve whereby it may completely retain the column in the shuttle end over which it is inserted and yet which permits a limited amount of expansion of that column as the shuttle spur shank is inserted into the bore, an amount which is insufficient to allow any cracking of the column.

It is a further object to provide a shuttle spur comprising a conical tip and a shank extending therefrom, a recess in the tip concentric with the shank, and a sleeve adapted to have one end thereof forcingly received into that recess, the sleeve having a plurality of longitudinal slits extending from said end partially along the length of the sleeve, whereby the sleeve may completely contain a column in the shuttle end over which it is inserted and yet be subject to limited expansion along that portion of the length thereof which is common to the shuttle tip.

It is a further object to provide means for more rigidly securing a shuttle spur to shuttle ends whereby loosening of the spur is less likely to occur in use in modern high speed looms.

Additional objects and advantages will be apparent from the description to follow.

In the drawings,

Fig. 1 is a plan view of one end of a shuttle having the invention applied thereto;

Fig. 2 is a view, partly in section, showing the shuttle spur, sleeve, and shuttle end in their assembled relationship;

Fig. 3 is a perspective view of a shuttle blank prior to mounting of the shuttle spur therein and final machining thereof;

Fig. 4 is a view, partly in section, of the shuttle spur;

Fig. 5 is an end view of the sleeve or ferrule used to anchor the shuttle spur to the shuttle; and Fig. 6 is a sectional view taken on line 6—6 of Fig. 5.

In Fig. 1 there is shown one end of a shuttle having a main body portion 11 which may be formed of wood or known plastic materials. The shuttle includes a conventional metallic spring 12 for retaining a bobbin 13 therein from which a weft yarn is fed as the shuttle is picked across the loom.

At each shuttle end there is permanently attached a metallic shuttle spur generally denoted by the arrow 14 and which includes a conical tip portion 15 and a cylindrical shank 16. A ferrule or sleeve 17 of novel structure aids in securing the spur to the shuttle in a manner to be explained.

In Fig. 4 the tip is shown as having a circumferential recess 18 extending from the base 19 of the tip inwardly toward the point 20 a substantial distance. This spur is adapted to be inserted in the end of a shuttle blank 11' shown in perspective in Fig. 3 which has a bore 21 extending axially inwardly from the end face 22 and which is of a diameter slightly less than that of the shank 16 so that the latter may be forcingly pressed thereinto. An annular recess 23 is provided in the shuttle blank of a depth slightly less than that of the recess 18 in the tip thereby leaving a stub 24 extending outwardly from the bottom 25 of recess 23. The blank is provided with a further recess 26 extending inwardly from the bottom 25 thereby to extend the length of the stub for reception thereinto of one end 27 of the sleeve 17. The sleeve preferably should extend a substantially greater distance into the wooden portion of the shuttle inwardly of the base 19 of the tip than in the opposite direction inwardly of the tip.

Now referring to Figs. 5 and 6 the sleeve 17 is provided with a plurality of slits 28 extending longitudinally from one end part way only along the length thereof. The inside diameter of the sleeve is tapered so that it is slightly greater than the outer diameter of the recess 18 while the inside diameter of the sleeve is smaller at the slotted end but larger at the opposite end than the outside diameter of the stub 24.

In assembly, when the spur shank 16 is inserted into the bore 21, a slight expansion of the stub 24 and sleeve takes place but not enough to allow cracking to occur. At the same time since the outer diameter of the recess 18 is less than that of the sleeve, the tip exerts a compressive force against that portion of the stub and sleeve which it contains while the shank exerts an expansive force against that same portion of the two. The shuttle spur is pressed into the shuttle end until the base 19 of the tip abuts against the bottom face 25 of the recess 23. The blank is then turned down to the dotted lines 29 (Fig. 3) to form a tapered end which merges smoothly with the conical surface of the tip. In such a combination the shuttle spur is very firmly anchored to the shuttle end and without any danger of cracking of the body portion of the shuttle.

While more or less specific proportions and/or dimensions have been referred to by way of a disclosure of a particular embodiment the invention may take, these are, of course, open to rather wide variation so long as the broader aspects of the invention are observed.

While one embodiment of the invention has been disclosed, it is to be understood that the inventive concept may be carried out in a number of ways. This invention is, therefore, not to be limited to the precise details described, but is intended to embrace all variations and modifications thereof falling within the spirit of the invention and the scope of the claims.

I claim:

1. For a loom shuttle, a shuttle spur comprising a conical tip and a shank extending therefrom, a recess in said tip concentric with said shank, and a sleeve adapted to have an end thereof forcingly received into said recess, said sleeve having a plurality of longitudinal slits extending from said end partially across the length of said sleeve.

2. For a loom shuttle, a shuttle spur comprising a tip tapering to a point in one direction from a base, a shank extending in the opposite direction from said base, a recess in said tip extending from said base toward said point and concentric with said shank, and a sleeve adapted to have an end thereof received into said recess, said sleeve having a plurality of longitudinal slits extending from said end partially across the length of said sleeve, the outer diameter of the sleeve being greater than the diameter of said recess.

3. A loom shuttle comprising a body portion having a cylindrical stub projecting from an end thereof, an axial bore within said stub, a shuttle spur including a tip tapering to a point in one direction from a base of said tip and a shank extending in the opposite direction from said base and being receivable forcedly into said bore, a recess in said tip extending from said base toward said point and concentric with said shank, a further recess in said shuttle end surrounding and concentric with said stub, and a sleeve one end of which has a plurality of longitudinal slits extending from said end partially across the length of said sleeve, the slotted end of the sleeve being receivable in the recess in said tip and the opposite end being receivable in the recess in the shuttle end.

4. The structure of claim 3 wherein the inside diameter of said sleeve is tapered toward said slotted end.

5. The structure of claim 3 wherein said shank is cylindrical and has a diameter greater than that of the axial bore into which it is inserted, the diameter of said stub is greater than that of the slotted end of said sleeve, and the outside diameter of the sleeve is greater than the diameter of the recess in the tip, whereby the shuttle spur, sleeve and shuttle end may be press fitted into firm engagement with each other.

References Cited in the file of this patent

UNITED STATES PATENTS

| | | |
|---|---|---|
| 2,501,624 | Tifft | Mar. 21, 1950 |
| 2,545,427 | Kaufmann | Mar. 13, 1951 |